United States Patent [19]

Bergmann

[11] Patent Number: 4,941,506

[45] Date of Patent: Jul. 17, 1990

[54] SANITARY MIXING VALVE

[75] Inventor: Konrad Bergmann, Wittlich, Fed. Rep. of Germany

[73] Assignee: American Standard Inc., New York, N.Y.

[21] Appl. No.: 335,081

[22] Filed: Apr. 7, 1989

[30] Foreign Application Priority Data

Apr. 8, 1988 [DE] Fed. Rep. of Germany ....... 3811708

[51] Int. Cl.$^5$ ..................... F16K 11/074; F16K 47/02
[52] U.S. Cl. ............................. 137/625.4; 137/625.17; 251/127
[58] Field of Search ........... 137/625.4, 625.41, 625.17; 251/118, 127

[56] References Cited

U.S. PATENT DOCUMENTS

| | | | |
|---|---|---|---|
| 3,519,020 | 7/1970 | Perret-Gentil | 137/625.17 |
| 4,301,836 | 11/1981 | Hunziker | 251/127 X |
| 4,513,781 | 4/1985 | Nikolayczik | 137/625.17 X |
| 4,540,023 | 9/1985 | Pawelzik | 137/625.17 X |
| 4,596,376 | 1/1986 | Knapp | 251/127 |

FOREIGN PATENT DOCUMENTS

| | | |
|---|---|---|
| 0059697 | 9/1982 | European Pat. Off. ......... 137/625.4 |
| 0063627 | 11/1982 | European Pat. Off. ......... 137/625.4 |
| 2845581 | 4/1980 | Fed. Rep. of Germany ... 137/625.4 |
| 3503793 | 8/1986 | Fed. Rep. of Germany . |

Primary Examiner—John Rivell
Attorney, Agent, or Firm—Blum Kaplan

[57] ABSTRACT

A single-handle sanitary valve, of the type having valve means including a movable control disc mounted in face-to-face seating contact with a stationary valve seat, is disclosed. The valve seat disc includes temperature attentuating means operatively coupled between the hot and cold water inlet openings of the stationary valve seat disc and the hot and cold water supply conduits so that when the mixing valve is in its operative mode, a relatively large movement of the handle produces only a relatively small change in mixed water temperature, thereby achieving a greater so-called comfort zone.

17 Claims, 3 Drawing Sheets

SANITARY MIXING VALVE

BACKGROUND OF THE DISCLOSURE

FIELD OF THE INVENTION

The invention relates to a single-handle sanitary mixing fitting and, more particularly, a temperature attentuating means operably coupled to the hot and cold water inlet openings of the valve means so that a relatively large movement of the handle produces a relatively small change in water temperature of the mixed water

DESCRIPTION OF PRIOR ART

Mixing valves of the type that attenuate the temperate zone for mixed water are known, such as is described in DE-OS No. 35 03 793, in which the inlet openings for cold and hot water, located in the valve seat disc, have reductions in their cross section. These reductions in cross section are designed to increase the adjustment pivot angle of the operating handle for the water mixing regulation system in the temperature range between approximately 30° and 45° Celsius, referred to as the "comfort zone", by reducing the clear cross section of the inlet openings in a predefined region in such a way that in this region, greater movement of the operating handle results in only a relatively small change in the flow of cold and hot water, thus making the mixing valve considerably more delicately adjustable in this comfort zone region.

In the known mixing valve, the reductions in cross section of the inlet openings consist of constrictions in the slit-shaped inlet openings formed out of the disc material, with the accompanying drawback that it is particularly difficult or indeed impossible to replace valve seat discs with conventional inlet openings with valve seat discs, according to the known mixing valve, for example, if the disc-shaped control elements are located in a welded cartridge housing. In addition, with the known mixing valve, the improvement in comfort zone is not effective over the entire opening stroke length of its handle.

SUMMARY OF THE INVENTION

The object of the invention is to provide an improved mixing valve in which a comfort zone regulation system is achieved by means of reductions in the cross sectional area at the inlet openings of the valve seat disc.

It is another object of the invention to provide a comfort zone system which is adaptable for use in present single-handle mixing valves.

A further object of the invention is to provide a comfort zone regulation system for use in single-handle mixing valves which is inexpensive to manufacture and install.

According to an embodiment of the invention, temperature attentuating means are mounted in a recess formed in the stationary valve seat disc upstream from the hot and cold water conduits. Each temperature attenuating means is formed with a shoulder-like projection and nests in a corresponding formed recess around each inlet opening of the stationary valve seat disc.

According to another embodiment of the invention, the temperature attenuating means is positioned in the hot and cold water inlet passageways of the valve body so that the cross sectional areas of the hot and cold water inlets are reduced. Such an arrangement is suitable for mixing valves in which the valve seat disc is mounted directly to the hot and cold water inlet passageways of the valve body where a cartridge body for housing the valving means is not used. In such cases, it is especially advantageous to locate the temperature attenuating means in juxtaposition with the hot and cold water connections, with the temperature attentuating means retained by dynamic seal members at their connection or transition points. Such dynamic seals are, for example, a resilient and deformable rubber-like material.

Another advantage of the present embodiment is to retrofit existing fittings since no change in the valve seat disc is necessary, or to mixing valves already in use of the type having control discs mounted in a welded cartridge housing.

With regard to adjustment of the volume of mixing water and the noise characteristics of the mixing valve, it may be advantageous to locate the orifices or channels in the temperature attentuating means perpendicular or obliquely, in a straight line or curved, or parallel, in each case with respect to the plane of the valve seat disc.

Furthermore, it may be advantageous for the temperature attenuating means, such as an insert, to consist of a sieve material; all of the embodiments may be made of plastic.

DETAILED DESCRIPTION OF THE PREFERRED EMBODIMENT

Figure 1:
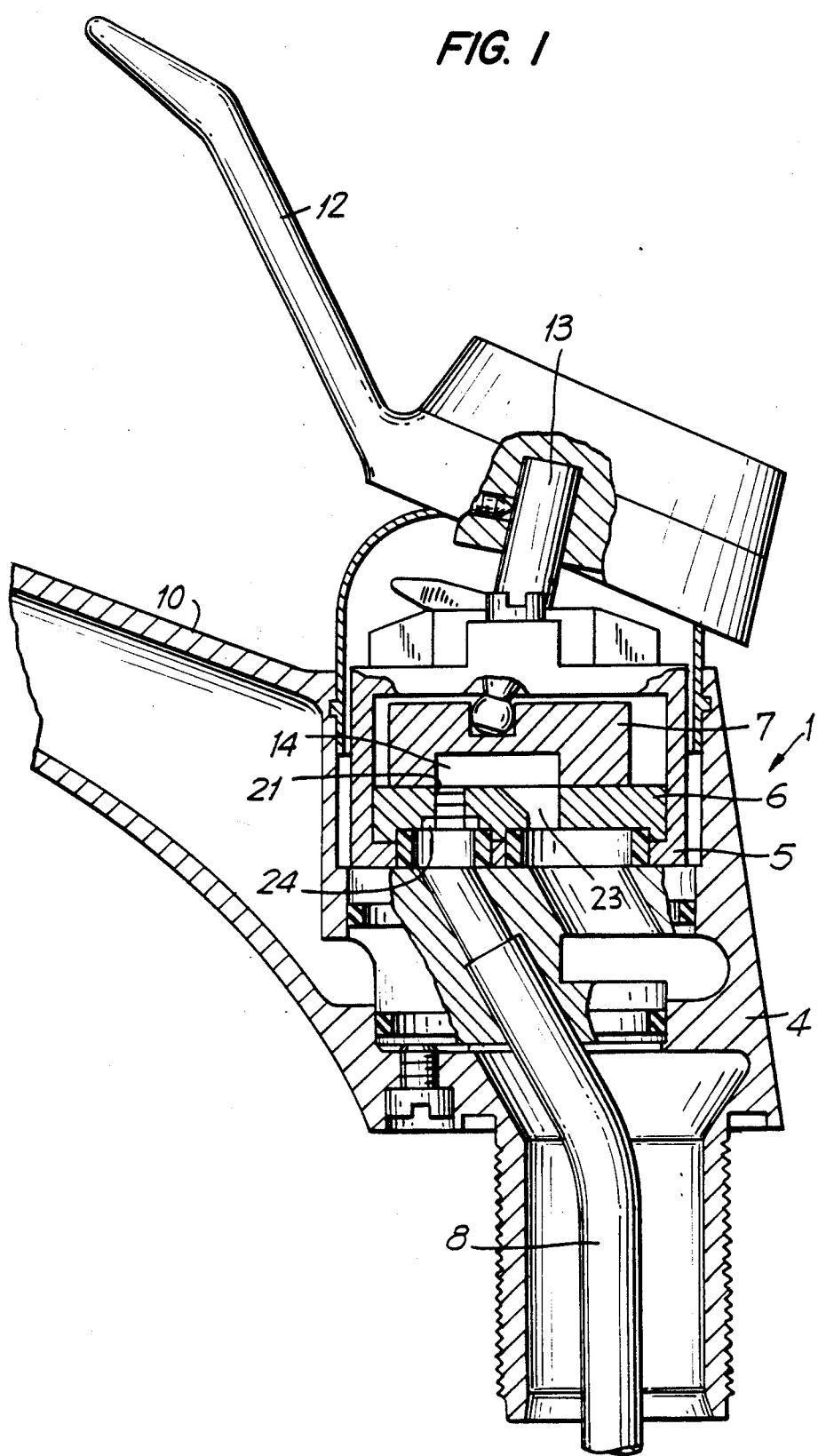
FIG. 1 is an elevational view, partly in section, of a sanitary mixing valve illustrating one form of the present invention.
Figure 2:
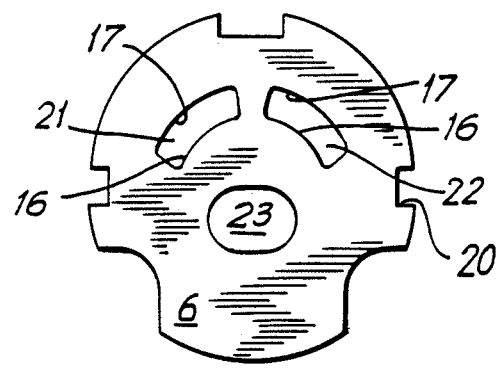
FIG. 2 is a top plan view of the stationary valve seat disc prior to mounting the temperature attenuating means in the hot and cold water inlet openings.

In FIG. 1 and FIG. 2, mixing valve 1 includes a valve body 4 in which is mounted a cartridge 5 that houses valve control elements consisting of two discs 6 and 7. Stationary valve seat disc 6 is secured in cartridge 5 by projections, not shown, which lock into recesses 20. Valve seat disc 6 is formed having an inlet opening 21 for hot water and an inlet opening 22 for cold water, and an outlet opening 23 which is in fluid communication with a delivery spout 10 of mixing valve 1. Inlet openings 21, 22 are shaped in the form of elongated slots with an outer defining edge 17 and an inner defining edge 16. Movable or control disc 7 is mounted in face-to-face sealing contact with valve seat disc 6, and is operatively coupled by pivot lever 13 so that control disc 7 is slideable on valve seat disc 6. Pivot lever 13 is coupled to operating handle 12 at one end and in a recess formed in control disc 7, as seen in FIG. 1. Control disc 7 is formed having a mixing chamber 14 with its open side facing valve seat disc 6, and provides mixing and diffusing functions when mixing chamber 14 overlaps or uncovers hot and cold inlet openings 21,22.

In this context, the inlet opening 21 for hot water is connected through a supply conduit 8 to a hot water source, not shown. Movable disc 7 is guided in the housing of cartridge 5 by known means of structures not illustrated in detail.

Figure 3:
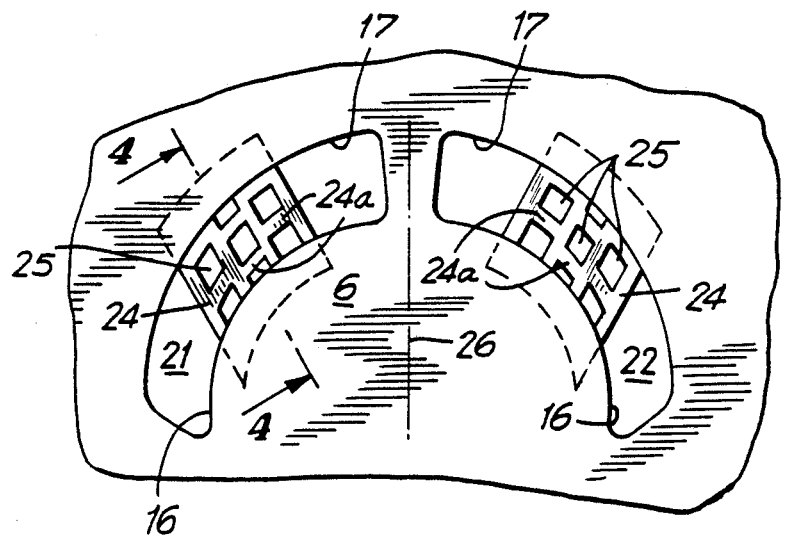
FIG. 3 is an enlarged fragmentary top plan view of the stationary valve seat disc with the temperature attenutating means mounted in the hot and cold water inlet openings.
Figure 4:
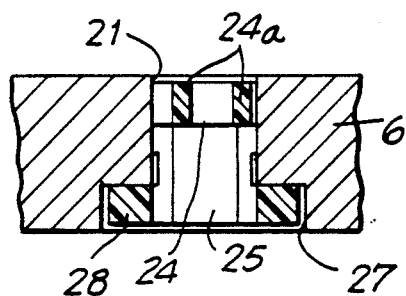
FIG. 4 is a sectional view taken along the line 4—4 of FIG. 3.

As FIGS. 3 and 4 show in more detail, located in inlet openings 21,22 for the hot and cold water are temperature attenuating means in the form of inserts 24 which have orifices 25 for the respective water streams. Inserts 24 are each located symmetrically about a center axis 26 of valve seat disc 6, with inlet openings 21,22, in turn, also lying symmetrically about the center axis 26 and corresponding to the state of the art for mixing valves of this type. The curved extent of the inserts covers approximately a third of the total curved length of openings 21,22. The arrangement of inserts 24 in inlet openings 21,22, and the number and arrangement of orifices 25 in inserts 24, depend on the definition of the particular desired pivot angle for operating lever 12 in the predetermined comfort zone region.

Inserts 24 are preferably manufactured from plastic, and are inset flush into valve seat disc 6. For this purpose, valve seat disc 6 is recessed in the vicinity of the defining edges 16,17 of inlet openings 21,22, resulting in inset recesses 27 on which sit shoulder-shaped projections 28 of inserts 24. Since the inserts are inserted into valve seat disc 6 in the flow direction of the water, as shown in the preferred embodiment from the bottom, both frictional and positive connection of the inserts is provided.

Orifices 25 may extend into inserts 24, either perpendicular or obliquely, to the plane of valve seat disc 6, and may be either straight or curved. Orifices 25 in inserts 24 are defined by means of ribs 24a which extend essentially perpendicular to the longitudinal plane defined by valve seat disc 6.

Although not illustrated, it is not absolutely necessary for inserts 24 to extend over the entire material thickness of valve seat disc 6. Instead, it is sufficient to fit the insert flush into the surface of valve seat 6 in the direction of the water flow so that the desired reduction in cross section is achieved by the perforated end plate.

Figure 5:
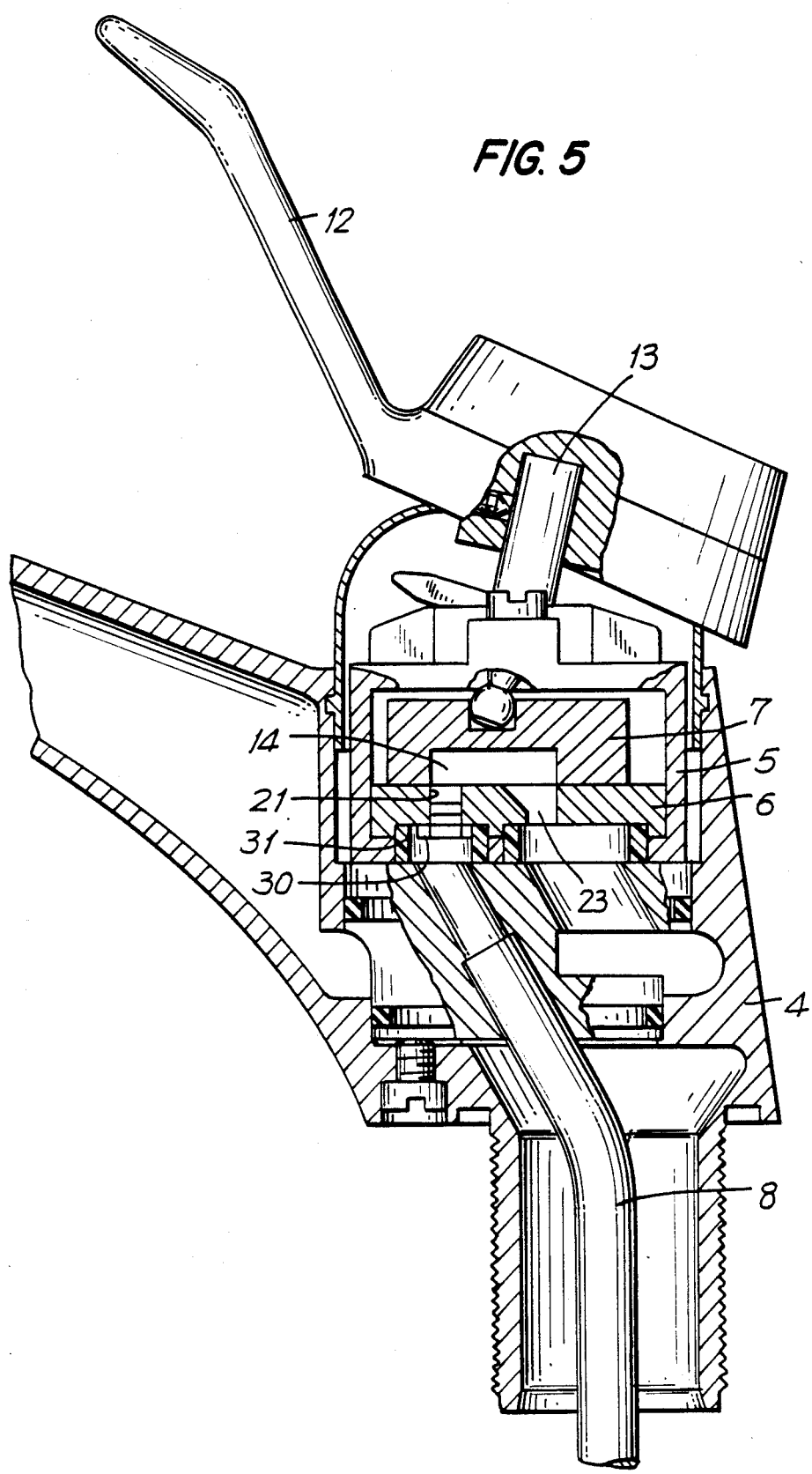
FIG. 5 is a view similar to FIG. 1 but illustrating another form of the present invention.

However, the invention is not restricted to provision of the reductions in cross section in openings 21,22 in valve seat disc 6 itself, as FIG. 5 illustrates. According to the invention, such inserts can also be located in the vicinity of the supply conduits 8 upstream from valve disc 6 and outside it. For this purpose, it is possible, for example, to retain inserts 30 by dynamic seals 31 between valve seat disc 6 and supply conduits 8. Although this is not illustrated in detail invention, shown in FIGS. and 4, for the water flowing through supply conduits 8.

The features of the object of this document disclosed in the above specification, claims and abstract can, individually and in any combination, be essential for the realization of the invention in its various embodiments.

It is claimed:

1. A single-handle sanitary mixing valve comprising valve means including a stationary valve seat disc having hot and cold water inlet openings and an outlet opening, and a movable disc having a water mixing chamber formed therein positioned in face-to-face sealing contact therewith, and temperature attenuating means including a plurality of spaced-apart openings operatively coupled to each of said inlet openings, said spaced-apart openings formed in one of said attenuating means being symmetrical with respect to said spaced-apart openings in said other attenuating means so that when said mixing valve is in its operative mode, a relatively large movement of the handle produces only a relatively small change in mixed water temperature, thereby achieving a greater temperature attenuation of mixed water, said temperature attenuating means being an insert which nests within said not and cold inlet openings of said valve seat disc.

2. The mixing valve, according to claim 1, wherein each of said inserts is mounted in said openings in the flow direction of the water flow through said valve seat disc.

3. The mixing valve, according to claim 1, wherein each of said inserts includes a shoulder formed at one end thereof, and said shoulder nests in a corresponding recess formed in the surface of said valve seat remote from said movable disc.

4. The mixing valve, according to claim 1, wherein said attenuating means partially overlaps said hot and cold water inlet openings in the valve seat disc.

5. The mixing valve, according to claim 1, wherein said spaced-apart openings of said attentuating means extend perpendicular to the plane of the valve seat disc.

6. The mixing valve, according to claim 1, wherein said spaced-apart openings of said attenuating means extend therethrough in a straight line.

7. The mixing valve, according to claim 1, wherein said spaced-apart openings of said attenuating means extend parallel to the longitudinal plane defined said valve seat disc and are defined by means of ribs running perpendicular to said plane.

8. A single-handle sanitary mixing valve comprising valve means including a stationary valve seat disc having hot and cold water inlet openings and an outlet opening, and a movable disc having a water mixing chamber formed therein positioned in face-to-face sealing contact therewith, and temperature attenuating means including a plurality of spaced-apart openings operatively coupled to each of said inlet openings, said spaced-apart openings formed in one of said attenuating means being symmetrical with respect to said spaced-apart openings in said other attenuating means so that when said mixing valve is in its operative mode, a relatively large movement of the handle produces only a relatively small change in mixed water temperature, thereby achieving a greater temperature attenuation of mixed water, each of said attenuating means being operatively coupled at the junction between the inlet openings of the valve seat disc and the hot and cold water conduits.

9. The mixing valve, according to claim 8, wherein said attenuating means is disposed against the valve seat disc in said hot and cold water supply conduits, and is mounted in sealing relation to said valve seat disc by a dynamic seal.

10. The mixing valve, according to claim 8, wherein said attenuating means partially overlaps said hot and cold water inlet openings in the valve seat disc.

11. The mixing valve, according to claim 8, wherein said spaced-apart openings of said attenuating means extend perpendicular to the plane of the valve seat disc.

12. The mixing valve, according to claim 8, wherein said spaced-apart openings of said attenuating means extend parallel to the longitudinal plane defined by said valve seat disc and are defined by means of ribs running perpendicular to said plane.

13. A single-handle sanitary mixing valve comprising valve means including a stationary valve seat disc having hot and cold water inlet openings and an outlet opening, and a movable disc having a water mixing chamber formed therein positioned in face-to-face sealing contact therewith, and temperature attenuating means including a plurality of spaced-apart openings operatively coupled to each of said inlet openings, said spaced-apart openings formed in one of said attenuating means being symmetrical with respect to said spaced-apart openings in said other attenuating means so that when said mixing valve is in its operative mode, a relatively large movement of the handle produces only a relatively small change in mixed water temperature, thereby achieving a greater temperature attenuation of mixed water, said spaced-apart openings of said attenuating means being defined by means of a perforated plate inserted flush into said valve seat disc.

14. A single-handle sanitary mixing valve comprising valve means including a stationary valve seat disc having hot and cold water inlet openings and an outlet opening, and a movable disc having a water mixing chamber formed therein positioned in face-to-face sealing contact therewith, and temperature attenuating means including a plurality of spaced-apart openings operatively coupled to each of said inlet openings, said spaced-apart openings formed in one of said attenuating means being symmetrical with respect to said spaced-apart openings in said other attenuating means so that when said mixing valve is in its operative mode, a relatively large movement of the handle produces only a relatively small change in mixed water temperature, thereby achieving a greater temperature attenuation of mixed water, said attenuating means being an insert made of a sieve material which is shaped to correspond to the shape of said inlet openings.

15. The mixing valve, according to claim 14, wherein said inserts are made of plastic.

16. A single-handle sanitary mixing valve comprising valve means including a stationary valve seat disc having hot and cold water inlet openings and an outlet opening, and a movable disc having a water mixing chamber formed therein positioned in face-to-face sealing contact therewith, and temperature attenuating means including a plurality of spaced-apart openings operatively coupled to each of said inlet openings, said spaced-apart openings formed in one of said attenuating means being symmetrical with respect to said spaced-apart openings in said other attenuating means so that when said mixing valve is in its operative mode, a relatively large movement of the handle produces only a relatively small change in mixed water temperature, thereby achieving a greater temperature attenuation of mixed water, said attenuating means being positioned in spaced relation to each end wall of said inlet openings of said valve seat disc so that said spaced-apart openings lie in the central region thereof.

17. A single-handle sanitary mixing valve comprising valve means including a stationary valve seat disc having hot and cold water inlet openings and an outlet opening, and a movable disc having a water mixing chamber formed therein positioned in face-to-face sealing contact therewith, and temperature attenuating means including a plurality of spaced-apart openings operatively coupled to each of said inlet openings, said spaced-apart openings formed in one of said attenuating means being symmetrical with respect to said spaced-apart openings in said other attenuating means so that when said mixing valve is in its operative mode, a relatively large movement of the handle produces only a relatively small change in mixed water temperature, thereby achieving a greater temperature attenuation of mixed water, said attenuating means extending over approximately a third of the cross sectional area of said inlet openings formed in said valve seat disc.

* * * * *